United States Patent [19]
Lindsay

[11] Patent Number: 5,271,880
[45] Date of Patent: Dec. 21, 1993

[54] INSERT MOLDING METHOD FOR A SEAL MEMBER

[75] Inventor: Ernest H. Lindsay, Manhattan, Ill.

[73] Assignee: Illinois Tool Works Inc., Glenview, Ill.

[21] Appl. No.: 895,730

[22] Filed: Jun. 9, 1992

[51] Int. Cl.$^5$ .................. B29C 33/76; B29C 45/14; B29C 45/16
[52] U.S. Cl. ........................... 264/219; 264/255; 264/279.1
[58] Field of Search ............... 264/254, 255, 271.1, 264/294, 328.7, 279.1, 272.11, 219; 425/130

[56] References Cited

U.S. PATENT DOCUMENTS

| | | | |
|---|---|---|---|
| 3,668,779 | 6/1972 | Turner | 264/272.11 |
| 4,686,766 | 8/1987 | Dubbs et al. | 264/271.1 |
| 4,983,344 | 1/1991 | Brown | 264/255 |

Primary Examiner—Jan H. Silbaugh
Assistant Examiner—A. Y. Ortiz
Attorney, Agent, or Firm—Schwartz & Weinrieb

[57] ABSTRACT

A method for encapsulating a seal member insert with plastic material has been provided in which the seal member insert is located precisely in a molded outer housing. There is provided an elongated mold core element having an undercut area at substantially its intermediate area. A first molten plastic is injected around the core element on each side of the undercut area so as to form annular retainer rings. The seal member insert is provided into the undercut area between the annular retainer rings. A second molten plastic is injected around the core element, the annular retainer rings, and the seal member insert so as to form the molded outer housing. The core element is then extracted so as to form a seal-insert molded product. The annular retainer rings serve as wall members so as to prevent the seal member insert from being moved out of the undercut area and into an undesired location when the second molten plastic is being injected.

20 Claims, 2 Drawing Sheets

INSERT MOLDING METHOD FOR A SEAL MEMBER

FIELD OF THE INVENTION

This invention relates generally to insert-injection molding processes and more particularly, it relates to an improved method of encapsulating a resilient workpiece such as a seal member within a mold so that it will be located precisely relative to the molded outer housing.

BACKGROUND OF THE INVENTION

In the manufacture of components, it is often desirable to create a seal between a first component and a second component at a precise location. In order to produce a fluid-tight interference fit between the first and second components, an undercut defining a groove is generally required to be cut from either the first or second component so as to receive the seal therein. The tolerances placed on the groove determines the effectiveness of the seal and is subject to large variations due to the types of materials used. It has been found that plastic encapsulation of a seal member insert substantially reduces the cost of final assembly.

For encapsulating in plastic by an injection insert-molding process, an upper mold plate and a lower mold plate forming a cavity therebetween is used. The seal member insert is placed in the mold and then the two plates of the mold are closed. A molten plastic is then forced into the cavity in a well-known manner and hardened about a portion of the seal to form a finished plastic package. Thereafter, the two plates of the mold are opened and the finished package is ejected.

The problem encountered in the prior art is that during the injection stage of the process the high injection pressure will cause the seal insert, being of a compressible material, to move or shift around in the mold. As a result, the precise location of the seal within the finished outer housing could not be controlled. Further, due to the difficulty in maintaining tight tolerances on the undercuts formed on the outer housing for receiving the seal, an effective seal was not always achieved.

It would therefore be desirable to provide an improved method of encapsulating a seal member within a mold so that it will be located precisely relative to the molded outer housing. It would also be expedient that the method of molding provides an effective and efficient seal each time without requiring tight tolerances on the undercuts formed in the outer housing.

OBJECTS OF THE INVENTION

Accordingly, it is a general object of the present invention to provide an improved method of insert-injection molding a resilient workpiece such as a seal member which is relatively simple and economical.

It is an object of the present invention to provide an improved method of encapsulating a seal member within a mold so that it will be located precisely relative to a molded outer housing.

It is another object of the present invention to provide an improved method for encapsulating a seal member insert so as to obtain an efficient and effective seal each time without requiring tight tolerances on the undercuts formed in the outer housing.

SUMMARY OF THE INVENTION

In accordance with these aims and objectives, the present invention is concerned with the provision of a method for encapsulating a seal member insert with plastic material so as to locate precisely the seal member insert in a molded outer housing. The method includes the step of providing an elongated mold core element having an undercut area at substantially its intermediate area. A first molten plastic is injected around the core element on each side of the undercut area so as to form annular retainer rings. A seal member insert is inserted into the undercut area between the annular retaining rings.

A second molten plastic is injected around the core element, the annular retaining rings, and the seal member insert so as to form a molded outer housing. Thereafter, the core element is extracted so as to form a seal-insert molded product. The annular retaining rings serve as wall members so as to prevent the seal member insert from being moved out of the undercut area and into an undesired location during the step of injecting the second molten plastic.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein.

DESCRIPTION OF THE PREFERRED EMBODIMENT

Figure 5:
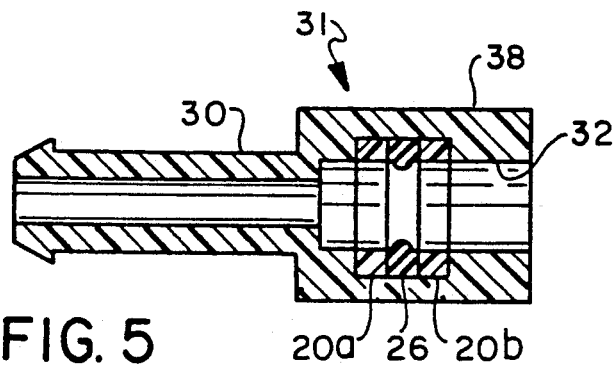
FIG. 5 illustrates the finished molded outer housing package, constructed in accordance with the novel method of the present invention and after the mold core element has been removed from the finished package.
Figure 6:
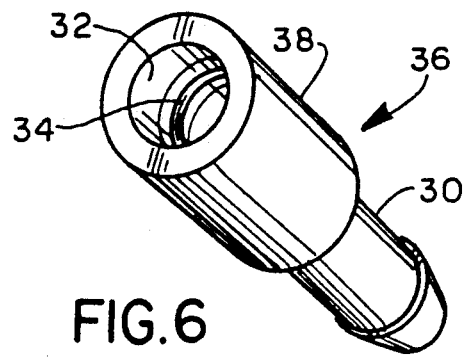
FIG. 6 is a perspective view of a finished encapsulated package, constructed in accordance with the present method.
Figure 7:
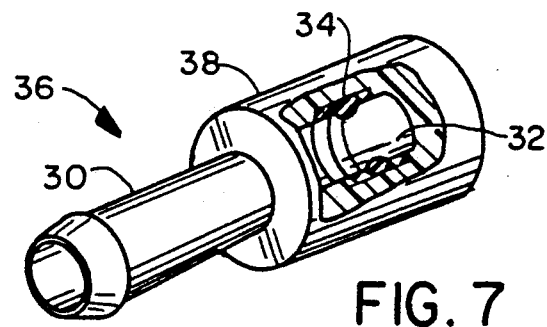
FIG. 7 is a view similar to FIG. 6, but partly in section, illustrating the finished encapsulated package.

Referring now in detail to the various views of the drawings, there are shown in FIGS. 1 through 4 the sequence of steps of the insert-injection molding operation of the present invention. The present invention is directed to an improved method of encapsulating a resilient workpiece such as a seal member within a mold so that it will be located precisely relative to a molded outer housing. The finished encapsulated package or insert molded seal product made in accordance with the novel sequence of operational steps of FIGS. 1 through 4 is illustrated in FIGS. 5 through 7.

Figure 1:
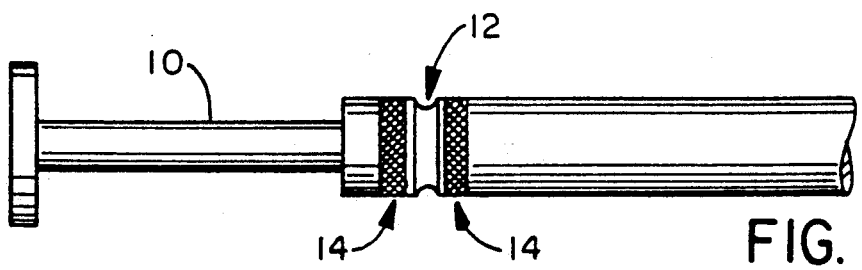
FIG. 1 is a cross-sectional view of a mold core element for use in the method of the present invention.

In FIG. 1, there is shown an elongated mold core element 10 which is formed preferably of a metallic material such as steel and the like. The mold core element 10 is provided with a precise undercut 12 at substantially its intermediate area. The undercut 12 is machined to a very tight tolerance so as to define a fluid-tight seal interference fit for the molded product. On each axial side of the undercut, there is placed a knurled area 14 which serves as retention devices for annular rings to be molded.

Figure 2:
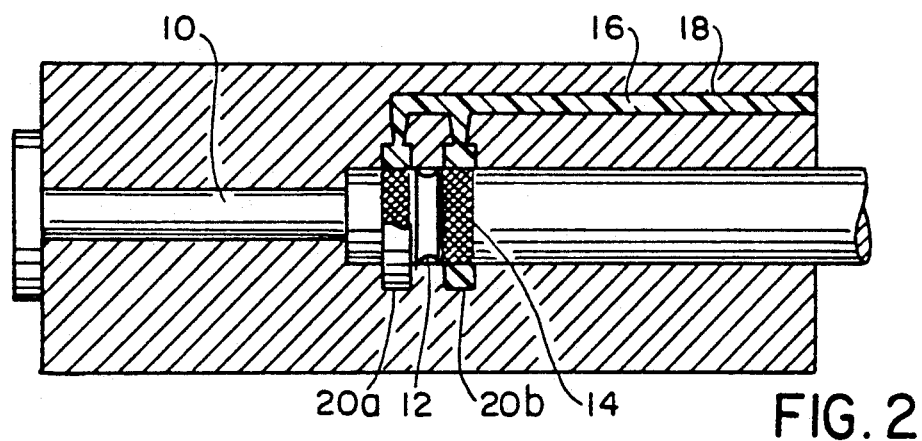
FIG. 2 is a cross-sectional, view illustrating the step of molding retainer rings around the core element of FIG. 1.

The mold core element 10 is then inserted into a first mold as shown in FIG. 2. Next, a plastic source (not shown) is used to selectively supply plastic encapsulating material 16 through a runner system 18 to form two annular retainer rings 20a and 20b. The annular rings are molded around the core element 10 and are arranged on each axial side of the undercut area 12. This molding operational step is illustrated in FIG. 2. It will be noted that the knurled areas 14 (FIG. 1) on the core element 10 serve to prevent the annular rings 20a and 20b from moving or slipping axially along the core element.

Figure 3:
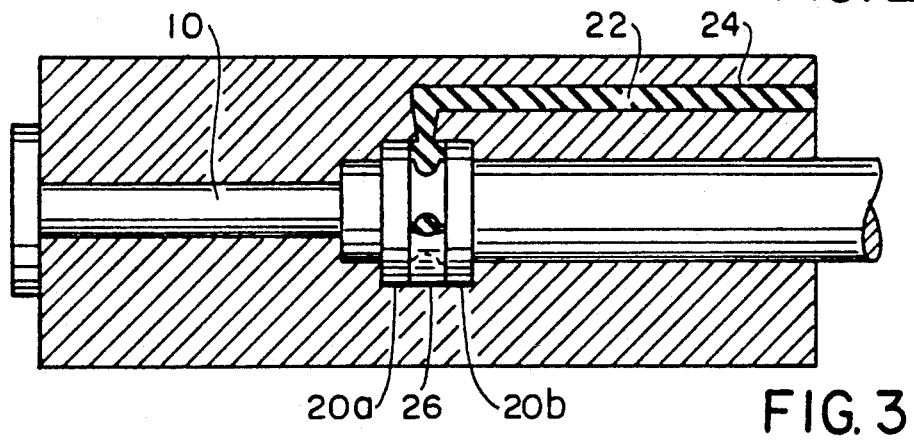
FIG. 3 is a cross-sectional view, illustrating the step of molding a seal member between the rings of FIG. 2.

The two molded annular retainer rings 20a and 20b and the core element 10 are then placed into a second mold as shown in FIG. 3. In FIG. 3, there is shown the next step of injecting a rubber sealing or elastomeric material 22 through a runner system 24 to form a resilient O-ring 26 or other similar type of seal device between the two molded retainer rings 20a and 20b. Alternatively, this second molding operational step could be replaced by an assembly process step in which the O-ring or seal device could be a distinct and separate component that is stretched or expanded over the outer diameter of one of the two retainer rings and then dropped down into the undercut area 12 existing therebetween.

Figure 4:
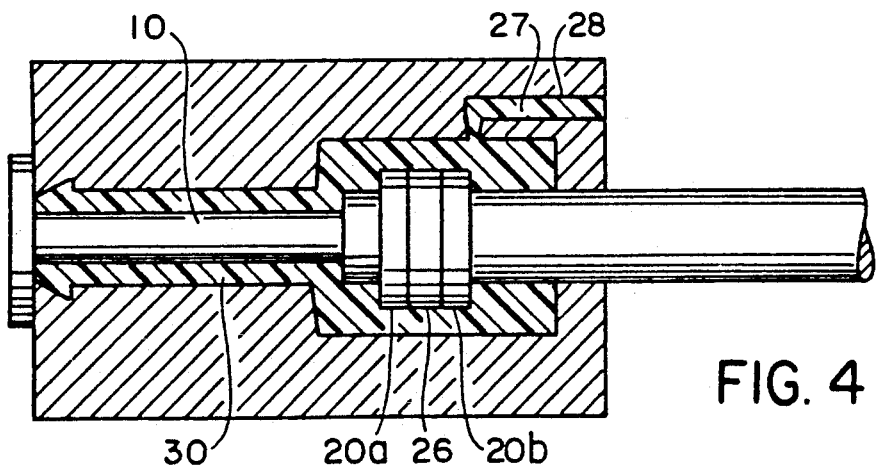
FIG. 4 is a cross-sectional view, illustrating the step of molding an outer housing around the core element, rings, and seal.

Thereafter, the assembly of the core element 10 with the two retainer rings 20a, 20b and the seal device 26 is placed into yet a third mold as shown in FIG. 4. In FIG. 4, there is depicted the next step of injecting a plastic encapsulating material 27 from a plastic source (not shown) through a runner system 28 to form an outer housing 30 around the core element 10, and the two retainer rings 20a, 20b with the sealing device 26 sandwiched therebetween. It will be noted that the two molded retainer rings 20a and 20b function as a retaining means so that when the outer housing is molded around the sealing device the rings will act as a wall member or dam means. As a consequence, the incoming plastic material 27, which is being applied under a high pressure, is prevented from pushing or moving the O-ring or seal device 26 out of the precise undercut area 12 and into an undesired location. In this manner, the seal member has been located precisely within the molded outer housing 30.

Finally, there is illustrated in FIG. 5 the last step of extracting or ejecting the mold core element 10 so as to form the finished molded product 31 consisting of the two retainer rings, seal device and outer housing all of a unitary construction. It should be understood that the seal member 26 being preferably of an elastomeric material such as rubber has a certain amount of compressibility. This feature is what actually allows the core element 10 to be extracted when it is pulled from the finished molded product 31. As can best be seen from FIG. 5, the seal device 26 actually protrudes into the bore 32 or diameter area that had been previously occupied by the mold core element 10. The amount of the seal device 26 that will be extending into the bore 32 of the molded housing 30 is determined effectively by the amount of the precise undercut area 12.

It is significant to note that in a conventional assembly of an O-ring type of a seal to provide a sealing around a shaft, whether it is to be rotatable or kept stationary, an annular groove of some kind is required to be cut into the interior wall of the outer housing to receive the O-ring seal. This prior art technique suffers from the disadvantage in that the required annular groove cannot be cut within critical tolerances, thereby always leaving a small amount of space into which the seal device can occupy due to its compressibility. As a result, there is not longer provided an effective compressive seal about the shaft which is the item to be sealed.

It is an important feature of the present invention that by packing the seal device 26 with the plastic material before the third mold operational step all of the tolerances are taken up or compensated for by the injected plastic material. During the injection of the plastic material, there is created a squeezing force around the seal device 26 so that no gaps or machining tolerances are left into which the seal device can be deflected. As a result, the precise undercut area 12 that was machined initially into the mold core element 10 can be adjusted very precisely so as to exhibit a very high quality in terms of repeatability from one finished molded product to the next. This amount of adjustment will be dependent upon the type of material that is being used for the seal device 26 as well as the type of material of the item to be sealed (that's, the shaft).

It should be apparent to those skilled in the art that the type of material used for the retainer rings 20a and 20b may be of the same type of material as used for the outer housing 30. On the other hand, the material of the retainer rings could also be of a dissimilar material so as to create an effective bushing arrangement with the outer housing such as required in applications where the shaft is to be rotated. Further, while the sealing device 26 of the drawings is illustrated with an annular surface, it should be clearly understood that the geometry of the seal contact face may be configured in any number of different sealing arrangements. For example, there could be provided multiple sealing configurations, such as with dual O-ring members.

FIG. 6 is a perspective view of an encapsulated seal package or finished molded seal product 36 constructed by the novel method of the present invention. FIG. 7 is a view similar to FIG. 6, but partly in section, illustrating the O-ring member 34 which has been molded within the outer housing 38.

From the foregoing detailed description, it can thus be seen that the present invention provides an improved method of encapsulating a seal member within a mold so that it will be located precisely relative to a molded outer housing. The method of the present invention includes the step of injecting a first molten plastic around a core element on each side of the undercut area so as to form annular retainer rings. The retainer rings serve as wall members so as to prevent a seal member insert from being moved out of the undercut area and into an undesired location during the subsequent step of injecting a second molten plastic to form an outer housing.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A method for encapsulating a seal member insert within plastic material so as to precisely locate said seal member insert within a molded outer housing, comprising the steps of:
   providing an elongated mold core element having an undercut area at substantially its intermediate area, and a longitudinal axis;
   injecting a first mold plastic around said core element upon each side of said undercut area so as to form axially spaced annular retainer rings;
   providing a seal member insert within said undercut area between said axially spaced annular retainer rings;
   injecting a second molten plastic around said core element said axially spaced retainer rings, and said seal member insert so as to form a molded outer housing; and
   extracting said core element so as to form a seal-insert molded product.

2. A method as claimed in claim 1, wherein said seal member insert is provided by a step of injecting an elastomeric material into the undercut area existing between the annular retainer rings.

3. A method as claimed in claim 1, wherein said sealing member insert is provided by a step of assembling a separate component into the undercut area existing between the annular rings.

4. A method as claimed in claim 1, wherein said undercut area is provided by a machining operation so as to obtain a tight tolerance.

5. A method as claimed in claim 1, wherein said core element is knurled on each axial side of the undercut area so as to prevent the annular retainer rings from moving axially along its length during the step of injecting the first molten plastic.

6. A method as claimed in claim 1, wherein said first molten plastic and said second molten plastic are made of the same material.

7. A method as claimed in claim 1, wherein said first molten plastic and said second molten plastic are made of different materials.

8. A method as claimed in claim 1, wherein said seal member insert is formed of a rubber material.

9. A method as claimed in claim 1, wherein when the core element is extracted said sealing member insert protrudes into a bore of the outer housing by an amount determined by said undercut area.

10. A method as claimed in claim 1, wherein said annular retainer rings serve as wall members so as to prevent said seal member insert from being moved out of the undercut area and into an undesired location during the step of injecting the second molten plastic.

11. A method for encapsulating a seal member insert within plastic material so as to precisely locate said seal member insert within a molded outer housing, comprising the steps of:
   providing an elongated mold core element having an undercut area at substantially its intermediate area, and a longitudinal axis;
   injecting a first molten plastic around said core element upon each side of said undercut area so as to form axially spaced annular dam means;
   injecting an elastomeric material into said undercut area between said axially spaced annular dam means so as to form a seal member insert;
   injecting a second molten plastic around said core element, said annular dam means, and said seal member insert so as to form a molded outer housing; and
   extracting said core element so as to form a seal-insert molded product.

12. A method as claimed in claim 11, wherein said undercut area is provided by a machining operation so as to obtain a tight tolerance.

13. A method as claimed in claim 11, wherein said core element is knurled on each axial side of the undercut area so as to prevent the annular dam means from moving axially along its length during the step of injecting the first molten plastic.

14. A method as claimed in claim 11, wherein said first molten plastic and said second molten plastic are made of the same material.

15. A method as claimed in claim 11, wherein said first molten plastic and said second molten plastic are made of different materials.

16. A method as claimed in claim 11, wherein said elastomeric material is rubber.

17. A method as claimed in claim 11, wherein when the core element is extracted said sealing member insert protrudes into a bore of the outer housing by an amount determined by said undercut area.

18. A method for encapsulating sealing means within plastic material so as to precisely locate said sealing means within a molded outer housing, comprising the steps of:
   providing elongated mold core means having an undercut area and a longitudinal axis;
   forming axially spaced annular retaining means upon said mold core means by injection molding a first molten plastic upon each side of said undercut area;
   providing sealing means upon said undercut area between said axially spaced annular retaining means;
   injection molding housing means around said mold core means, said axially spaced annular retaining means, and said sealing means from a second molten plastic; and
   extracting said mold core means so as to form a seal-insert molded product.

19. A method as claimed in claim 18, wherein said undercut area is provided by a machining operation so as to obtain a tight tolerance.

20. A method as claimed in claim 18, wherein said retaining means serve as wall members so as to prevent said sealing means from being moved out of the undercut area and into an undesired location during the step of forming the housing means.

* * * * *